(12) United States Patent
Wang et al.

(10) Patent No.: US 8,571,373 B2
(45) Date of Patent: Oct. 29, 2013

(54) PHOTONIC CRYSTAL BAND-SHIFTING DEVICE FOR DYNAMIC CONTROL OF LIGHT TRANSMISSION

(76) Inventors: Xiaolong Wang, Austin, TX (US); Ray T Chen, Austin, TX (US); Harish Subbaraman, Austin, TX (US)

( * ) Notice: Subject to any disclaimer, the term of this patent is extended or adjusted under 35 U.S.C. 154(b) by 43 days.

(21) Appl. No.: 13/068,830

(22) Filed: May 23, 2011

(65) Prior Publication Data
US 2012/0301075 A1    Nov. 29, 2012

(51) Int. Cl.
*G02B 6/10*    (2006.01)

(52) U.S. Cl.
USPC ............. 385/129; 385/28; 385/27; 385/130

(58) Field of Classification Search
USPC ............... 385/125–129, 4; 356/477
See application file for complete search history.

(56) References Cited

U.S. PATENT DOCUMENTS

| | | | |
|---|---|---|---|
| 6,879,766 B2 | 4/2005 | Tomaru | |
| 6,917,431 B2 | 7/2005 | Soljacic et al. | |
| 7,068,865 B2 * | 6/2006 | Hamann et al. | 385/8 |
| 7,194,174 B2 * | 3/2007 | Dridi et al. | 385/129 |
| 7,298,945 B2 * | 11/2007 | Gunn et al. | 385/37 |
| 7,421,179 B1 | 9/2008 | Jiang et al. | |
| 2010/0310208 A1 * | 12/2010 | Wang et al. | 385/14 |
| 2011/0028346 A1 * | 2/2011 | Chakravarty et al. | 506/12 |
| 2013/0005606 A1 * | 1/2013 | Chakravarty et al. | 506/9 |

* cited by examiner

*Primary Examiner* — Ellen Kim
(74) *Attorney, Agent, or Firm* — Taboada Law Firm, PLLC; John M. Taboada

(57) ABSTRACT

An active device for dynamic control of lightwave transmission properties has at least one photonic crystal waveguide that has anti-reflection photonic crystal waveguides with gradually changed group refractive indices at both input and output side. An alternating voltage or current signal applied to two electrically conductive regions changes the refractive indices of the photonic crystal materials, introducing a certain degree of blue-shift or red-shift of the transmission spectrum of the photonic crystal waveguide. The output lightwave with frequency close to the band-edge of the photonic crystal waveguide is controlled by the input electric signal. Devices having one or more such active photonic crystal waveguides may be utilized as an electro-optic modulator, an optical switch, or a tunable optical filter.

20 Claims, 12 Drawing Sheets

PHOTONIC CRYSTAL BAND-SHIFTING DEVICE FOR DYNAMIC CONTROL OF LIGHT TRANSMISSION

STATEMENT REGARDING FEDERALLY SPONSORED RESEARCH

The U.S. Government has a paid-up license in this invention and the right in limited circumstances to require the patent owner to license others on reasonable terms as provided for by the terms of the contracts FA9550-09-C-0086 awarded by Air Force Office of Scientific Research.

BACKGROUND OF THE INVENTION

1. Field of the Invention

This invention relates generally to the field of optical devices, and more specifically to an apparatus and method for modulation, switching and dynamic control of light transmission using photonic crystals.

2. Description of the Related Art

On-chip optical modulators have paramount significance as inter- and intra-chip optical interconnects become an essential solution to the great challenges in speed, power dissipation and electromagnetic interference (EMI) that modern very large scale circuitry (VLSI) technology is facing. On-chip optical modulators, especially monolithically integrated silicon modulators, coupled with external infrared lasers and silicon photonic waveguides, can transmit ultra-high bit rate (>10 Gbit/sec) signals with low loss and low cross talk. However, conventional telecom optical modulators using LiNbO3 or III-V semiconductor materials cannot be integrated on silicon substrates. Recently, Liu et al. demonstrated a silicon Mach-Zenhder interferometer (MZI) modulator (A. Liu, R. Jones, L. Liao, D. Samara-Rubio, D. Rubin, O. Cohen, R. Nicolaescu, M. Paniccia, "A high-speed silicon optical modulator based on a metal-oxide-semiconductor capacitor," Nature, 427, 615-618, 2004) with 10 Gbit/sec speed. But the total device length is over 1 cm and is not suitable for on-chip optical interconnects. M. Lipson's group at Cornell University reported ultra-compact silicon ring-resonator modulators with 10 μm diameter (M. Lipson, "Compact electro-optic modulators on a silicon chip," IEEE J. Sel. Topics in Quantum Electron., 12, 6, 1520-1526, 2006). However, a ring resonator is a narrow band (<0.1 nm) device, which cannot operate at very high speed (>10 Gbit/sec).

Photonic crystals are a class of novel materials that offer new opportunities for the control and manipulation of light. Essentially, a photonic crystal consists of a periodic lattice of dielectric materials. The underlying concept of photonic crystals originated from seminal work by Eli Yablonivitch and Sajeev John in 1987. The basic idea was to engineer a dielectric super-lattice so that it manipulates the properties of photons in essentially the same way that regular crystals affect the properties of electrons therein. Like the token of semiconductors, a photonic band gap exists for photons in a photonic crystal in a continuous range of frequencies where light is forbidden to travel regardless of its direction of propagation. Silicon photonic crystal modulators have been proposed and demonstrated based on MZI structures with length reduced by slow photon effect. For example, an 80 μm active length MZI modulator was demonstrated with 1 Gbit/sec electro-optic modulation (Y. Jiang, et al, "80-micron interaction length silicon photonic crystal waveguide modulator, Applied Physics Letter, vol. 87, No. 22, 2005). However, the total device length is still several millimeters when including the conventional splitting and merging waveguide. Although an all-photonic-crystal approach can further reduce the total length, such a device is very lossy, especially in the slow photon region. This kind of all-photonic-crystal modulator has never been realized.

Generally, on-chip and chip-to-chip optical interconnects desire an ultra-compact electro-optic modulator that can be monolithically integrated on silicon substrates. Also, it requires the modulator to operate at a high modulation speed (>10 Gbit/sec) with low power dissipation. Additionally, the modulator should cover an acceptable optical bandwidth (>1 nm) for stable performance and channel spacing. Electro-optic modulators based on new modulation mechanisms and new architectures are needed. An optical modulator satisfying all the aforementioned requirements does not exist until this moment.

BRIEF SUMMARY OF THE INVENTION

The primary object of the invention is to provide an integrated electro-optic modulator with ultra-compact size that can be monolithically integrated with VLSI circuitry for on-chip and chip-to-chip optical interconnects.

Another object of the invention is to reduce the power dissipation and mitigate heating generation of the optoelectronic device.

The third object of the invention is to improve the modulator performance in terms of reducing optical loss by significantly shortening the total device length, especially by shortening the photonic crystal waveguide length.

Other objects and advantages of the present invention will become apparent from the following descriptions, taken in connection with the accompanying drawings, wherein, by way of illustration and example, an embodiment of the present invention is disclosed.

In accordance with a preferred embodiment of the present invention, a device for dynamic control of light transmission comprises: a functional photonic crystal waveguide having a waveguide core along which light is guided, an input and output photonic crystal waveguide with gradually changed group index before and after the functional photonic crystal waveguide, which can bridge the refractive indices difference between conventional optical waveguides and the functional photonic crystal waveguide, a first substantially electrically conductive region formed on one lateral side of the photonic crystal waveguide core, and a second substantially electrically conductive region formed on the other side of the photonic crystal waveguide core and coupled to the first conductive region across the waveguide core.

BRIEF DESCRIPTION OF THE DRAWINGS

The drawings constitute a part of this specification and include exemplary embodiments of the present invention, which may be embodied in various forms. It is to be understood that in some instances various aspects of the present invention may be shown exaggerated or enlarged to facilitate an understanding of the invention.

A more complete and thorough understanding of the present invention and benefits thereof may be acquired by referring to the following description together with the accompanying drawings, in which like reference numbers indicate like features, and wherein.

DETAILED DESCRIPTIONS OF THE PREFERRED EMBODIMENTS

Detailed descriptions of the preferred embodiments are provided herein. It is to be understood, however, that the present invention may be embodied in various forms. Therefore, specific details disclosed herein are not to be interpreted as limiting, but rather as a basis for the claims and as representative basis for teaching one skilled in the art to employ the present invention in virtually any appropriately detailed system, structure or manner.

With increasing concerns about power consumption and electromagnetic interference (EMI) as the feature size of VLSI circuits pushes deeper and deeper into nanometer scale, using sub-micron photonic technology for chip-to-chip and on-chip communications becomes an essential solution for the stringent demands on bit rates and power dissipation. Monolithically integrated modulators, especially silicon electro-optic (E-O) modulators, will play a key role for on-chip and chip-to-chip optical interconnects. The present invention on band-shifting photonic crystal modulators demonstrates significant advantages over the state-of-the-art modulators, mostly achieved through miniaturized device size. This section will provide detailed description of the preferred embodiments in the aspect of device architecture, as well as the design concept and working principal.

Figure 1:
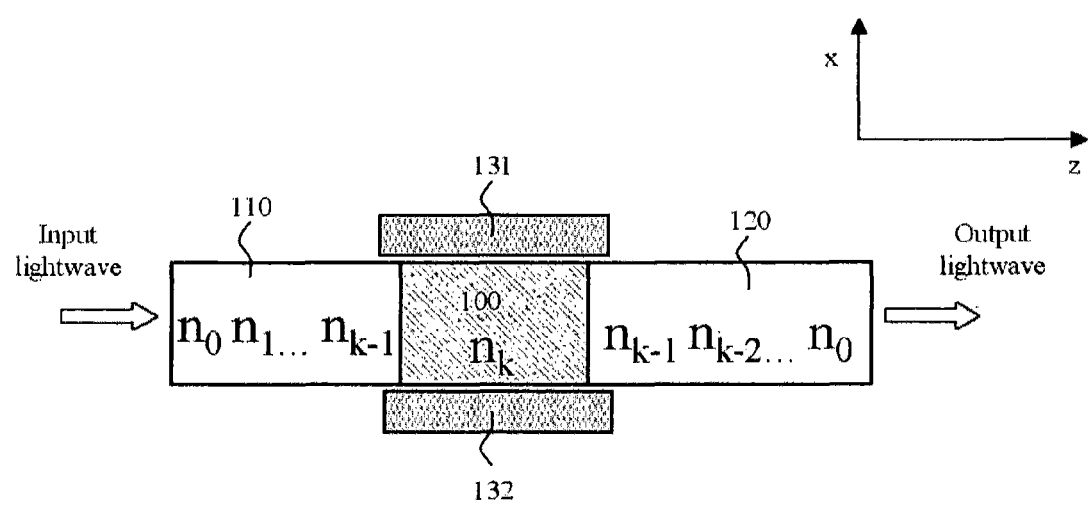
FIG. 1 is a schematic drawing showing the design concept of a band-shifting photonic crystal modulator with anti-reflection group index tapering photonic crystal waveguides and electrically conductive regions.

FIG. 1 presents a schematic drawing of the band-shifting photonic crystal modulator. It consists of a functional photonic crystal waveguide 100 with group index of $n_k$, two group index tapering photonic crystal waveguides 110 and 120, and two electrodes 131 and 132 which are substantially parallel to the functional photonic crystal waveguide 100. As the wavevector of the optical mode approaches $\pi/2$, the group index $n_k$ of the functional photonic crystal waveguide 100 increases sharply, which is called "slow photon effect" in many papers and patents. This abnormally high group index caused a significant drop of the light transmission near the band edge because of strong reflection. To improve the transmission efficiency, T. Tomaru et al presented an anti-reflection technology by disposing two photonic crystal waveguides with a lower group index on both sides of the main photonic crystal waveguide. In this invention, we propose an improved design with gradually changed group index photonic crystal waveguides 110 and 120. The refractive index taper, $n_0 n_1 \ldots n_{k-1}$, can more effectively bridge the index difference between normal optical waveguide and photonic crystal waveguide with slow photon effect. The substantially parallel electrode pair 131 and 132 driven by electrical signals change the refractive indices of the photonic crystal waveguide 100 through electric field or injected carriers, thus the band diagram of the functional photonic crystal waveguide is shifted to a higher (called blue-shift) or lower frequency (called red-shift), depending on the polarity of the electric field. If the input wavelength is close to the band edge in the diagram, a guided mode before applying the electric signal can fall into the forbidden band after applying the electric signal if the band diagram is blue-shifted, or vice versa if the band diagram is red-shifted. By this modulation mechanism, we can control the light transmission through a very short length (less than 10 μm) of photonic crystal waveguide.

Figure 2:
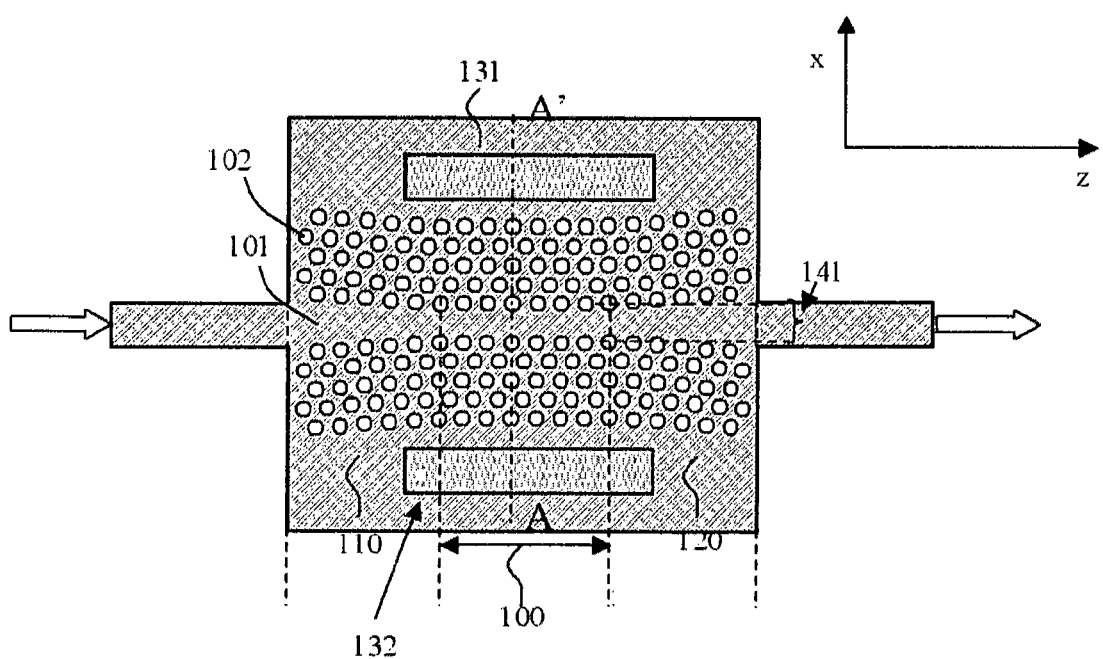
FIG. 2 is a top view of one embodiment of a band-shifting photonic crystal modulator based on photonic crystal slab waveguide by removing a line of air holes or holes filled with other low refractive index dielectric materials.
Figure 3:
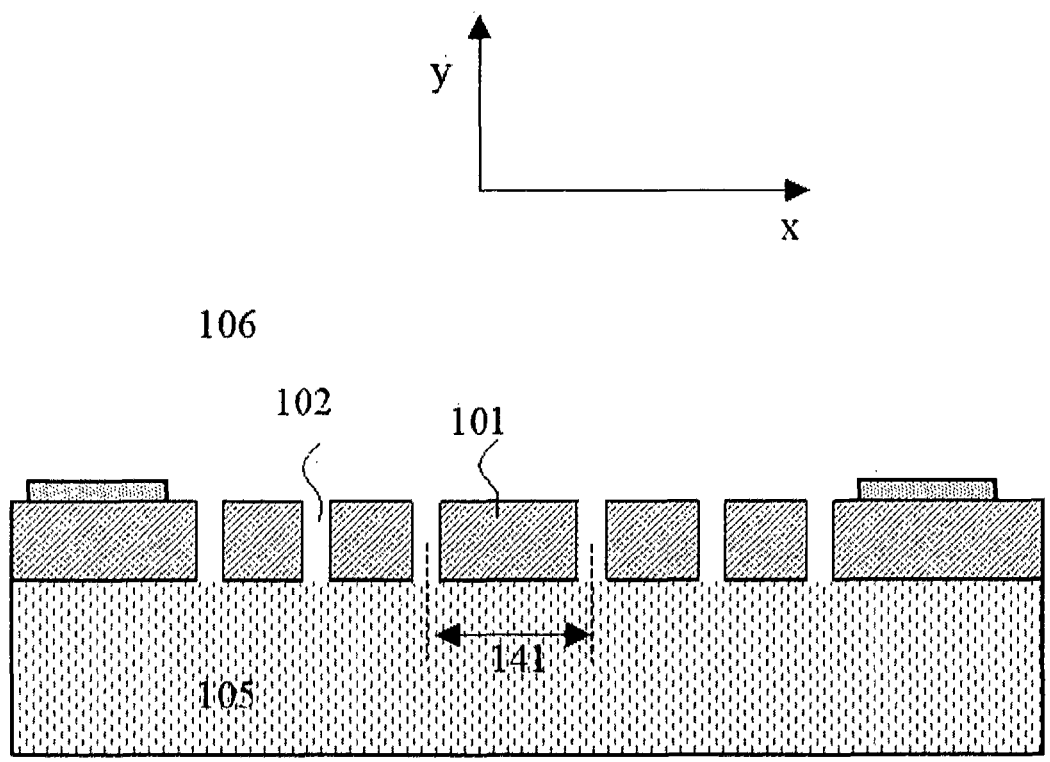
FIG. 3 is a cross-sectional view of the device shown in FIG. 2.

FIG. 2 depicts a top view of one embodiment of a band-shifting photonic crystal modulator based on semiconductor photonic crystal slab waveguide. The functional photonic crystal waveguide 100 includes a number of column members 102 etched through or partially into the semiconductor slab 101. The waveguide core 141 is defined as the space between the centers of two column members adjacent to the region where the columns are absent. In one preferred embodiment, the column members 102 are arranged to form a periodic lattice with a lattice constant α. In some embodiments, the width of waveguide core 141 can range from $$\frac{\sqrt{3}}{2}\alpha$$

to $50\sqrt{3}\alpha$. The arrows indicate the direction in which electromagnetic waves are coupled into and out of the photonic crystal modulator. The group index tapering photonic crystal waveguides 110 and 120 can be formed by, but not limited to the method of, gradually increasing the width of the waveguide core 141. With reference to FIG. 3, which is a cross-sectional view of the functional photonic crystal waveguide 100 in FIG. 2 taken along line A-A', the column members 102 extend throughout the thickness of the slab 101 to reach a substrate 105. Although the structure within the slab 101 is substantially uniform in the vertical direction in this embodiment, one skilled in the art will understand that vertically non-uniform structure, such as the columnar members 102 whose radii are varying along the vertical direction, may be used as well. The column members 102 can be either simply void or filled with other dielectric materials. For a photonic crystal waveguide 100, 110 and 120, which comprise photonic crystals of two-dimensional periodicity, the wave guiding in the vertical direction must be provided by conventional index-guiding scheme. This means a substrate 105 and a superstrate 106 with a lower effective index relative to that of the slab material must be disposed below and above the slab 101. In FIG. 3, the superstrate is absent and simply represented by air or vacuum. On one side, the substrate 105 and superstrate 106 prevent guided lightwave escaping far away from the top and bottom surfaces of the slab 101. On the other hand, they can also serve as an electrically insulating layer to prevent charges circumventing the thin slab layer 101. In most applications, it is desirable that the waveguide have a single guided mode, which can be achieved through adjusting the width of the waveguide core 141.

In one embodiment, the slab 101 is formed from a material of high refractive index including, but not limited to, silicon, germanium, carbon, gallium nitride, gallium arsenide, gallium phosphide, indium nitride, indium phosphide, indium arsenide, zinc oxide, zinc sulfide, silicon oxide, silicon nitride, alloys thereof, metals, and organic polymer composites. Single crystalline, polycrystalline, amorphous, and other forms of silicon may be used as appropriate. Organic materials with embedded inorganic particles, particularly metal particles, may be used to advantage. In one embodiment, the superstrate 106 and substrate 105 are formed from a material whose refractive index is lower than that of the slab material. Suitable superstrate and substrate materials include, but not limited to, air, silicon oxide, silicon nitride, alumina, organic polymers and alloys thereof. In one embodiment, the columnar members 102 are formed from a material whose refractive index is substantial different from that of the slab 101. Suitable materials for the columnar members 102 include, but not limited to, air, silicon oxide, silicon nitride, alumina, organic polymers, or alloys thereof. In one preferred embodiment, the slab 101 is formed from silicon, the columnar members 102 are formed from air, the superstrate 106 is air, and the substrate 105 is formed from silicon oxide.

Figure 4:
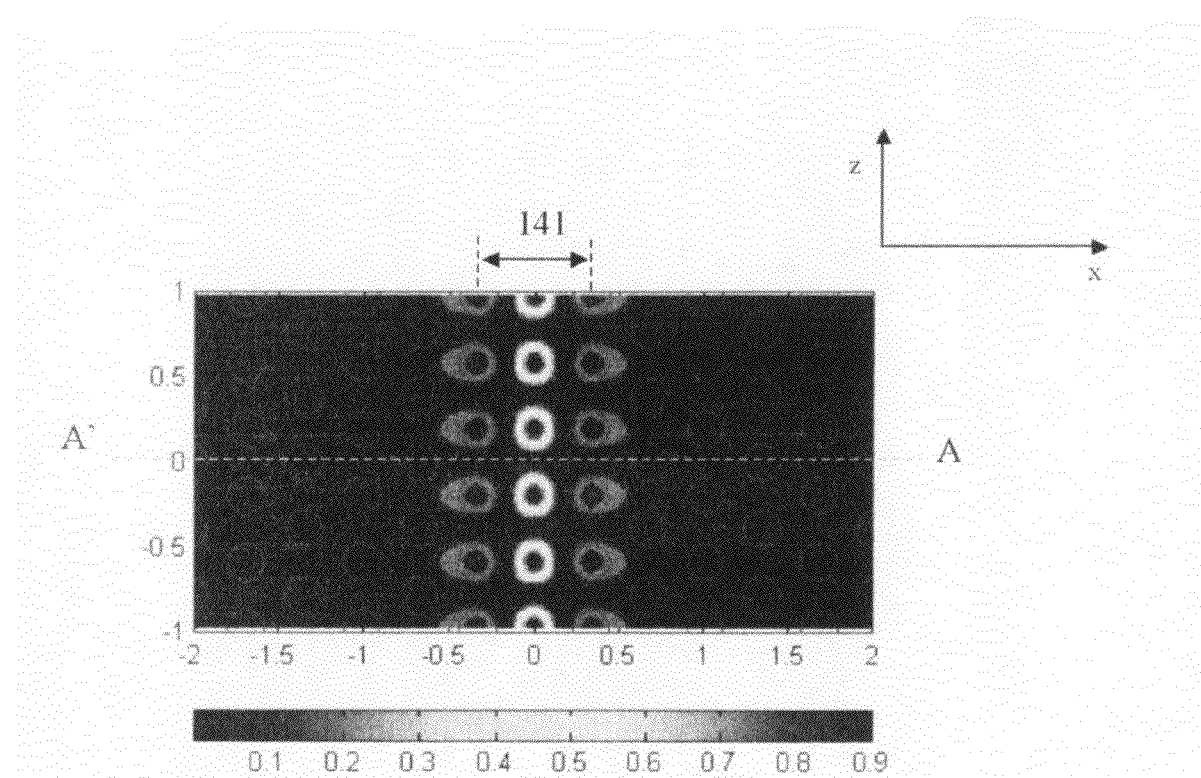
FIG. 4 is a cross-sectional view of the field intensity pattern of a guide mode of a photonic crystal waveguide depicted in FIG. 2 and FIG. 3.

FIG. 4 depicts a top view of the field intensity pattern of a guided mode of a waveguide 100 in FIG. 2 and FIG. 3. The circles indicate columnar members of the photonic crystal waveguide. It is seen in FIG. 4 that peak of the field intensity is well confined inside the waveguide core region 141. Outside of 141, there are two side peaks due to evanescent field. FIG. 4 suggests that change in the refractive index inside region 141 can most effectively modulate the lightwave.

Figure 5:
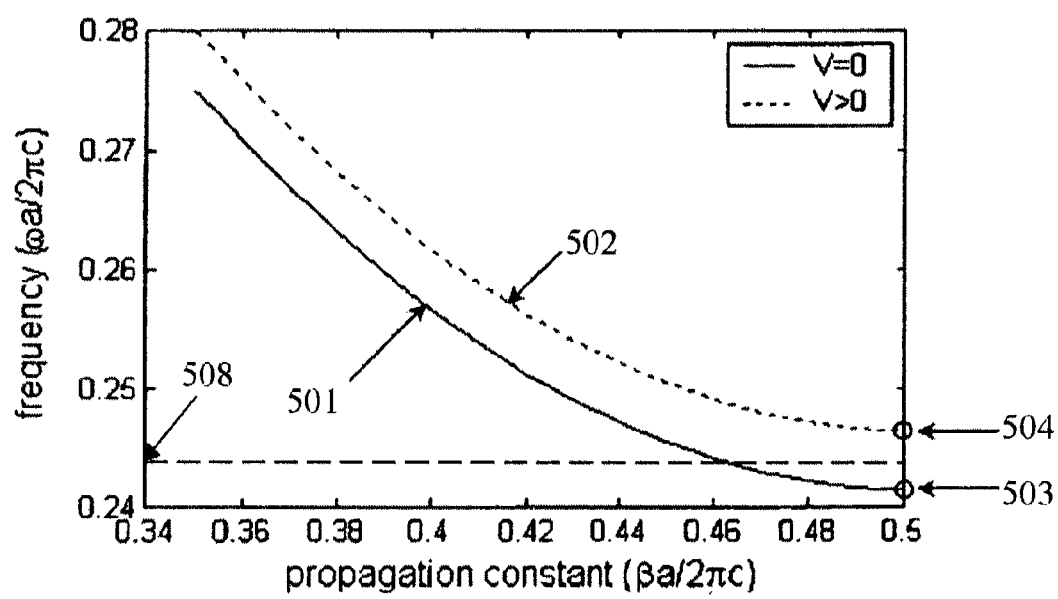
FIG. 5 illustrates a typical diagram of the dispersion relation of a photonic crystal waveguide depicted in FIG. 2 and FIG. 3.

FIG. 5 depicts an illustrative diagram of the dispersion relation of a guided-mode of the functional photonic crystal waveguide 100 in FIG. 2. In FIG. 5, $\omega$ is the circular frequency of light, $\beta$ is the propagation constant, and $\alpha$ is the lattice constant of the photonic crystal. The curve 501 represents the dispersion relation of the functional photonic crystal waveguide 100 without any applied voltage, whereas the curve 502 represents the dispersion relation of the functional photonic crystal waveguide 100 with an applied voltage. The frequency of the input lightwave 508 is higher than the frequency of the band edge 503 of curve 501, but lower than the frequency of the band edge 504 of curve 502. The intercept of 508 with curve 501 indicates that the input lightwave can be transmitted through the functional photonic crystal waveguide 100 as guided mode. As a contrast, 508 falls below the curve 502 suggests that the input lightwave is in the forbidden band of the functional photonic crystal waveguide 100 and be rejected to pass through.

The blue-shift of curve 501 to 502 is due to the refractive index change caused by the applied voltage. One of the preferred embodiments is through plasma dispersion effect, which takes, for example, the form of $\Delta n = -[8.8 \times 10^{-22} \Delta N_e + 8.5 \times 10^{-18} (\Delta N_h)^{0.8}]$ in silicon. The refractive index n of the silicon slab 100 is changed owing to the changes of electron and hole concentrations, $\Delta N_e$ and $\Delta N_h$. According to the present invention, the changes of the electron and hole concentrations, and therefore, the change of refractive index primarily occur in the waveguide core 141 depicted in FIG. 2, where light intensity is the strongest as shown in FIG. 4. Thus, it is conducive to enhance the light-matter interaction and, therefore, the modulation efficiency of the functional photonic crystal waveguide 100.

Another preferred embodiment is using Pockel's effect from nonlinear materials including, but not limited to gallium arsenide, indium phosphide, and organic polymer materials. The refractive index change is determined by $\Delta n = \frac{1}{2} n^3 \gamma_{33} E$ where $\gamma_{33}$ is the electro-optic coefficient, and E is the electric field intensity. The presence of group index tapering photonic crystal waveguides 110 and 120 is essential because they increase the coupling efficiency of the input lightwave 508, especially when 508 is close to the band edge 503. One preferred embodiment of the group index tapering photonic crystal waveguide is, but not limited to, tuning the width of waveguide core 141. To be convenient, we use a new definition of W1 for photonic crystal waveguide core width of $\sqrt{3}\alpha$, W1.1 for $1.1\sqrt{3}\alpha$, and so on.

Figure 6:
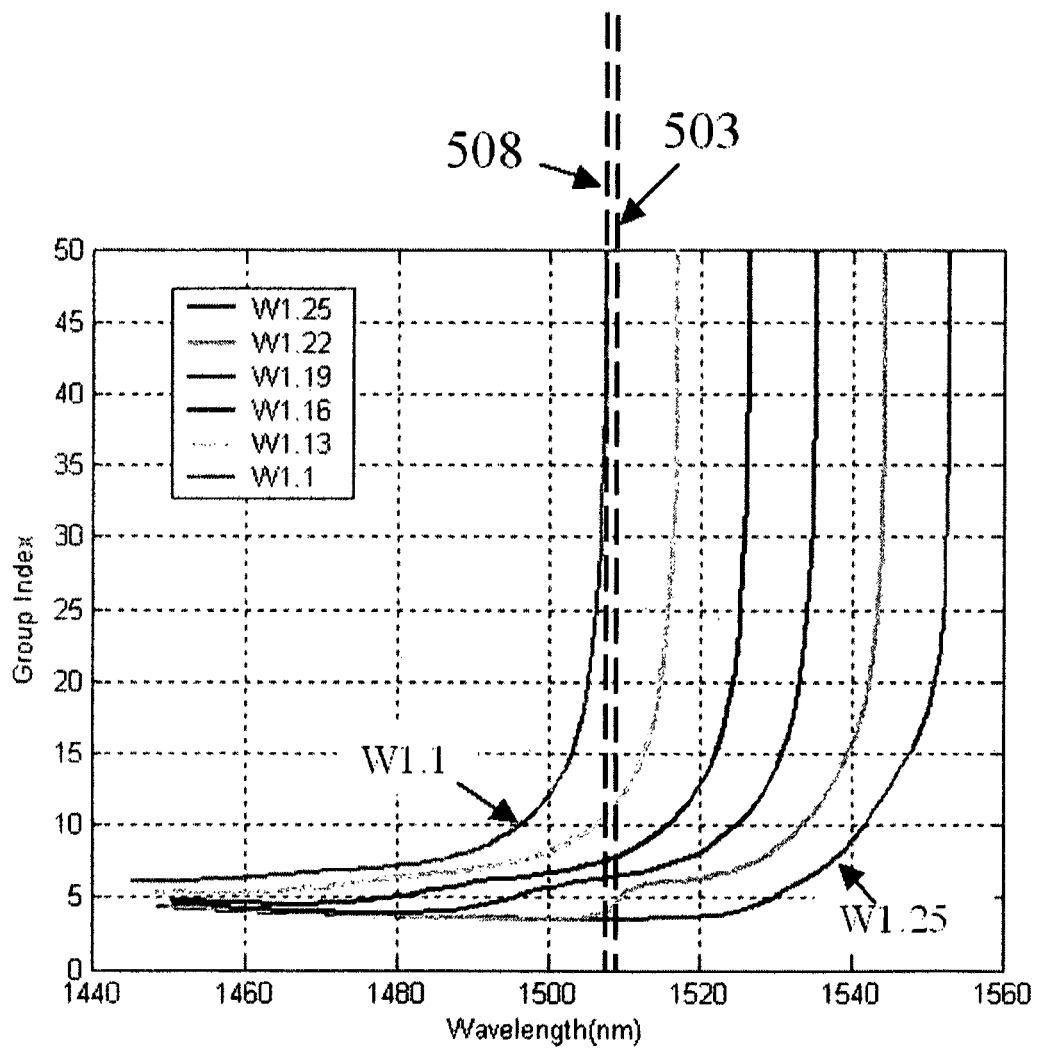
FIG. 6 shows the group refractive index of the functional photonic crystal waveguide and the group index tapering photonic crystal waveguides.

FIG. 6 illustrates how the photonic crystal tapering waveguide 110 affects the coupling efficiency of the functional photonic crystal waveguide 100. As the input lightwave 508 is very close to the band edge 503, the group index of the functional waveguide 100 (W1.1) is much higher ($n_k > 50$) than conventional waveguide with group index $n_0 = 3$. The intensity of the reflected light is given by $$R = \frac{n_k^2 - n_0^2}{n_k^2 + n_0^2} = 78.6\%.$$

As waveguide 110 (W1.25 gradually transits to W1.1) is disposed between waveguide 100 and the conventional waveguide, it introduces a group index taper from 3 to 50. This group index tapering photonic crystal waveguide will significantly reduce the lightwave reflection.

Figure 7:
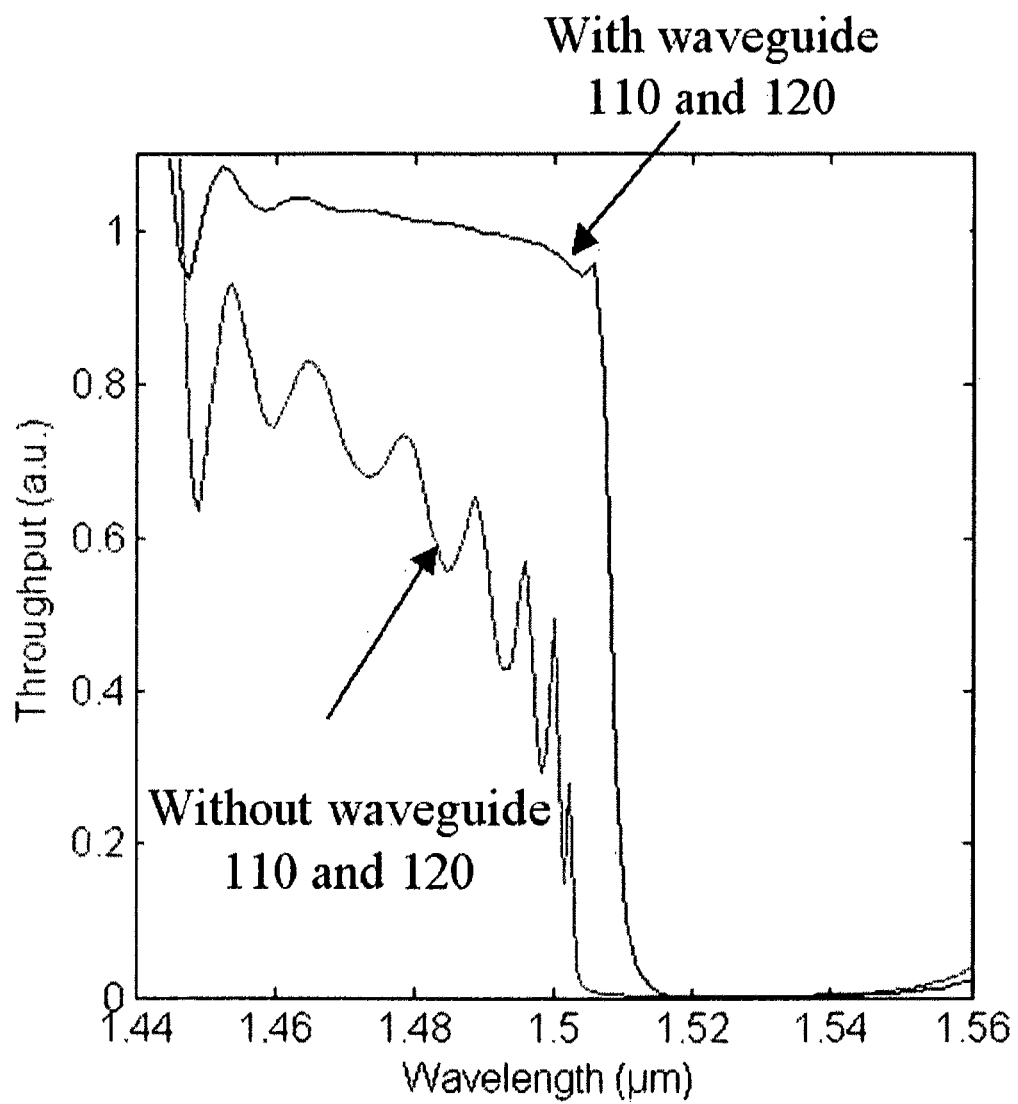
FIG. 7 shows the transmission spectrum of a functional photonic crystal waveguide with and without group index tapered photonic crystal waveguides.

FIG. 7 shows the simulation results of the light transmission efficiency of the functional photonic crystal waveguide 100 with group index tapering photonic crystal waveguide 110 and 120, and the one without 110 and 120. It is seen that the transmission efficiency of 100 with 110 and 120 remains nearly constant until the input wavelength is very close to the band edge. Then the throughput drops sharply to ground level because of the photonic crystal band gap. As a comparison, the transmission of 100 without 110 and 120 gradually decrease as the input wavelength approaches the band edge due to the increased reflection, and also shows obvious ripples caused by resonating effect. Generally speaking, the blue-shift or red-shift of the transmission spectrum of photonic crystal waveguide 100 cannot exceed 1%, depending on the applied voltage and electro-optic efficiency of the materials. The transmission spectrum with a sharp drop near the band edge enhances the sensitivity of the photonic crystal modulator, and reduces the optical loss as well.

Figure 8:
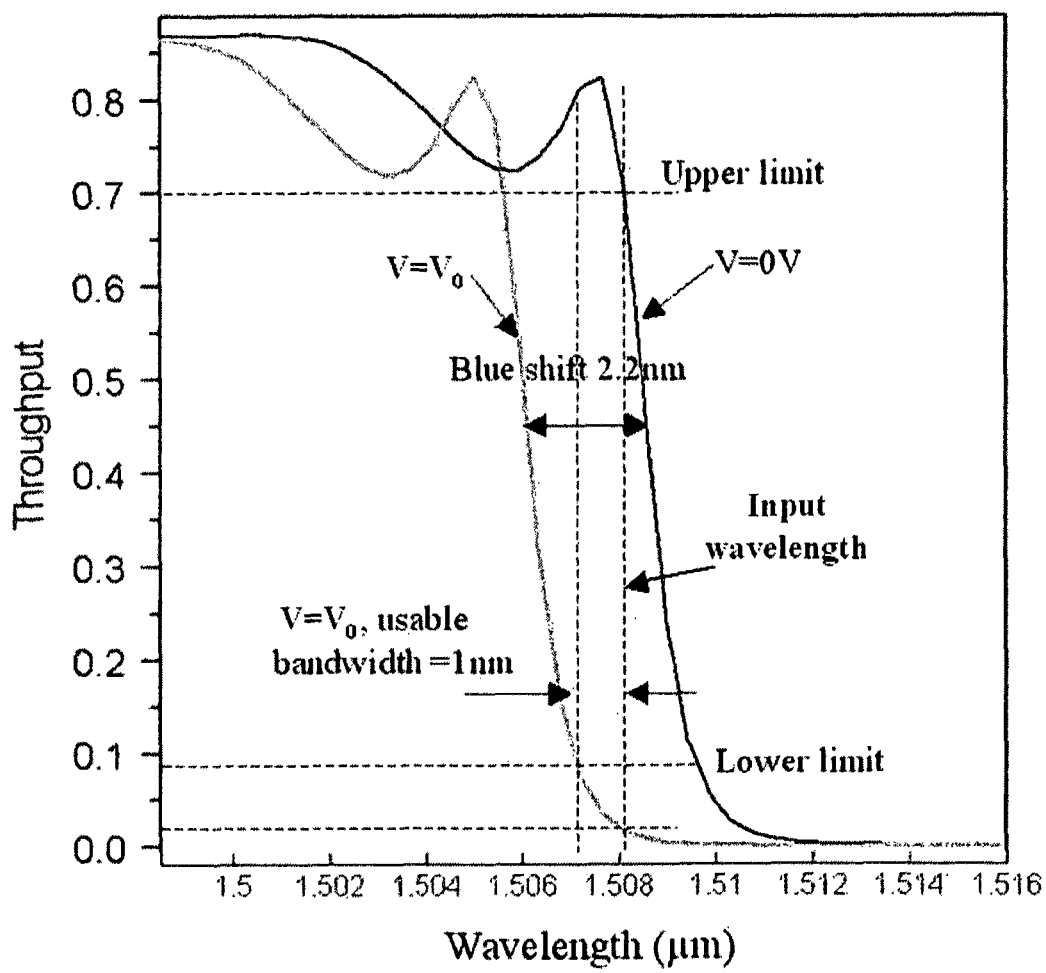
FIG. 8 shows the enlarged view of the transmission spectrum near the band edge of the photonic crystal with and without electrical modulation signal.

FIG. 8 shows the enlarged view of the transmission spectrum near the band edge. We assume the applied voltage introduces a refractive index modulation of −0.006, which is achievable through injecting carrier concentration of $6.8 \times 10^{18}/cm^3$. If we set the probing wavelength to be 1508.1 nm, the index modulation will reduce the optical power from 70% of the input to only 2%. Or we can present the results in another way: if we set the required upper limit of 70% and the lower limit of 8%, a −0.006 index modulation will achieve a usable optical bandwidth of 1 nm. This value is obtained by the 2.2 nm blue shift minus 1.2 nm bandwidth consumed by the band edge. Of course, if a perfect taper is designed with infinite periods of group index tapers, the bandwidth consumed by the band edge will be 0, and the maximum usable bandwidth of 2.2 nm can be achieved. This modulator will be useful for dense wavelength division multiplexing (DWDM) network with 80 GHz spacing and high speed (>40 GHz) optical interconnects. As a comparison, the ring resonator only has a full wave half width (FWHM) of 0.04 nm. Plus, the band-shifting modulator has an extendable bandwidth up to tens of nanometers, which is simply dependent on the blue shift capability of the transmission spectrum. With the improvement of the nonlinear materials, the bandwidth of the proposed modulator can be potentially improved, or equivalently, the driving voltage can be reduced as well.

Figure 9:
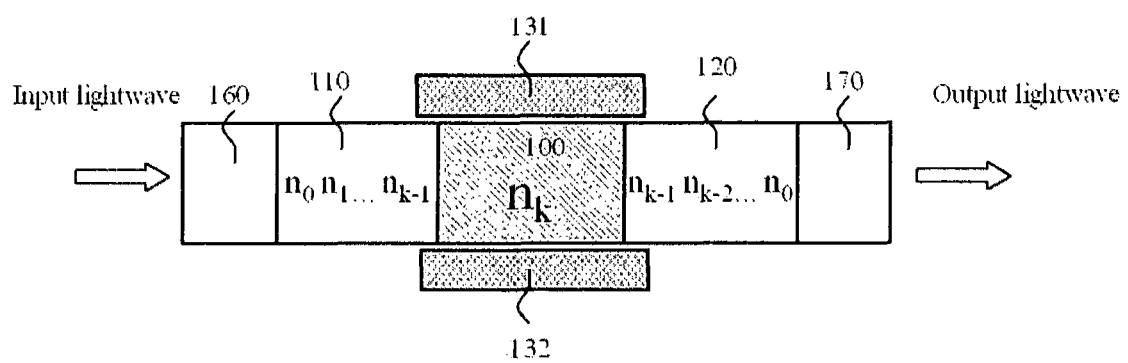
FIG. 9 is another schematic drawing showing the design concept of a band-shifting photonic crystal modulator with anti-reflection group index tapering photonic crystal waveguides, optical mode converters and electrically conductive region.

The second design concept of this invention is depicted in FIG. 9. Compared with the first design concept depicted in FIG. 1, an optical mode converter 160 is placed between the input optical waveguide and the group index tapering photonic crystal waveguide 110, and another optical mode converter 170 is placed on the output side as well. The optical mode converters 160 and 170 can more effectively reduce the coupling loss due to the optical mode profile mismatch between the input optical waveguide and the photonic crystal waveguide. The modulation mechanism of the photonic crystal modulator is exactly the same as the one depicted in FIG. 1.

Figure 10:
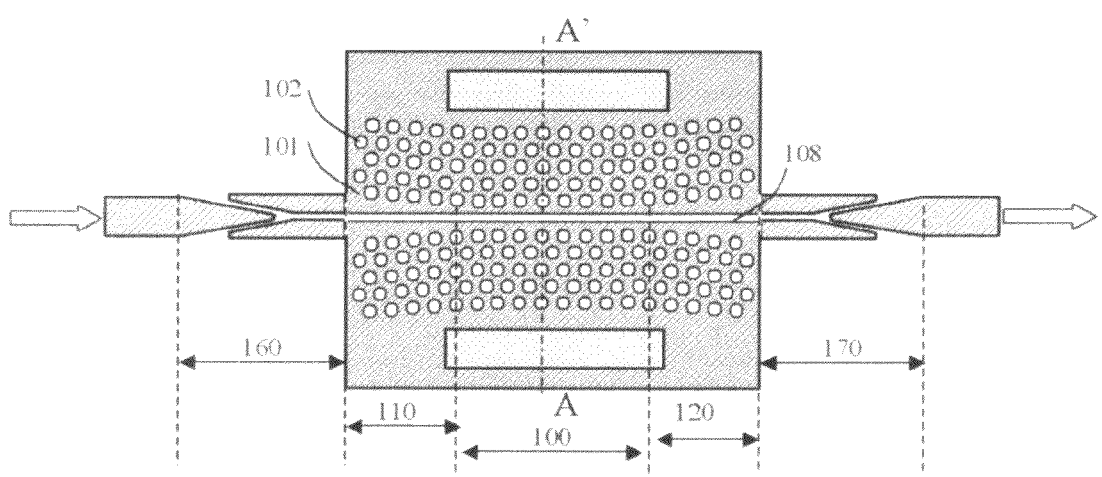
FIG. 10 is a top view of one embodiment of a band-shifting photonic crystal modulator depicted in FIG. 9 based on photonic crystal slab waveguide by replacing a line of air holes with a certain width of slot. The slot (or the slot and air holes) can be filled with other dielectric materials, either organic or inorganic.

In one embodiment of this design concept, the entire structure shown in FIG. 10 is formed on a silicon-on-insulator wafer, which has a silicon slab disposed on the top of a silicon dioxide substrate. The functional photonic crystal waveguide 100 is formed by replacing a line of column members with a slot 108 etched to the silicon dioxide layer. The slot 108 can be filled with, but not limited to, silicon dioxide, organic polymer composites, silicon nitride, zinc sulfide, zinc oxide, and lithium niobate. The slot functions as an electrically insulating layer, which draws most of the electric potential drop because of its high resistance relative to the conducting silicon slab. On the other hand, it confines most of the optical field intensity inside the narrow slot region, which provides an excellent overlap with the electric field. The group index tapering photonic crystal waveguide 110 and 120 functions exactly the same way as they do in FIG. 2. The unique feature of the photonic crystal waveguide with a slot is the optical mode profile, which has a peak on each side of the slot. Directly coupling lightwave from a conventional rectangular waveguide into the photonic crystal waveguide with a slot will result in significant loss due to the optical profile mismatch. The optical mode converter 160 shown in FIG. 10 couples the input lightwave through evanescent field into two side waveguides of the input waveguide, achieving a gradual and lossless optical mode conversion with little optical loss. The optical mode converters 160 and 170, together with the group index tapering photonic crystal waveguides 110 and 120, help to couple light into the functional photonic crystal waveguide 100 with maximum efficiency, especially for the lightwave frequency close to the photonic band edge. The modulation mechanism of FIG. 10 is also based on shifting the band diagram of the photonic crystal waveguide. As we described in FIG. 5, we can either use plasma dispersion relation or Pockel effect to change the refractive index of the photonic crystal materials. However, in this embodiment, Pockel effect is preferred because the narrow slot enhances the electric field intensity, which can reduce the driving voltage for the photonic crystal modulator.

Figure 11:
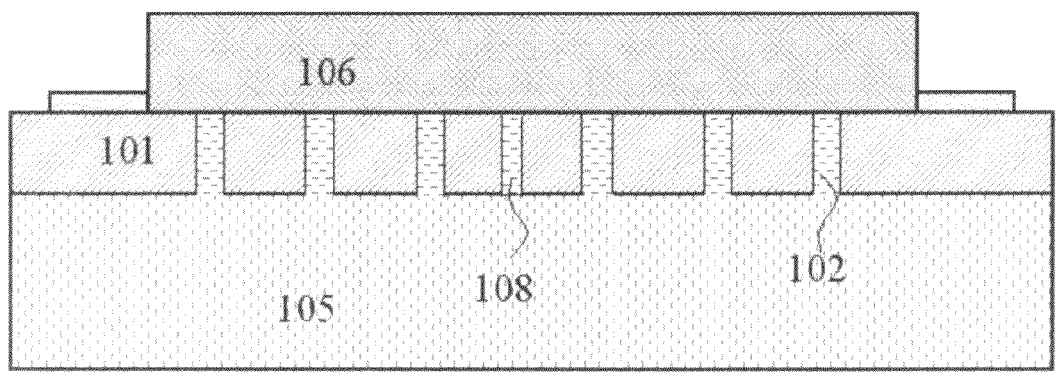
FIG. 11 is a cross-sectional view of one embodiment of a device shown in FIG. 9.
Figure 12:
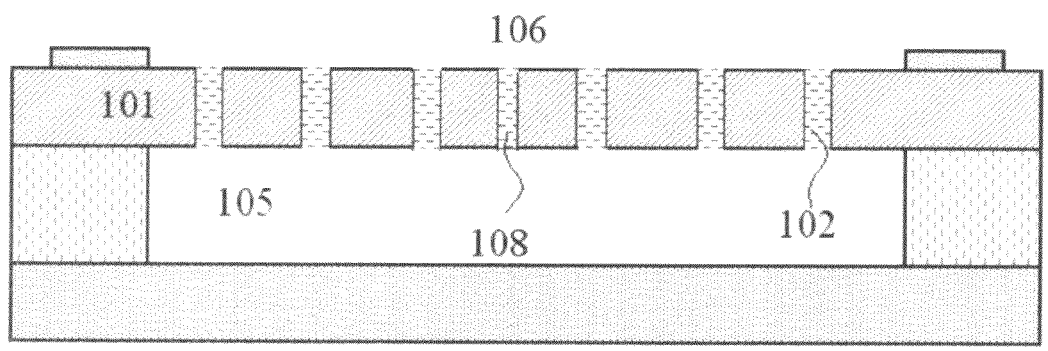
FIG. 12 is a cross-sectional view of another embodiment of a device shown in FIG. 9.

Furthermore, several alternate embodiments of some features of the photonic crystal waveguide according to the present invention will be described in the following. These alternate embodiments of some features are applicable to any of the photonic crystal waveguides 100, 110 and 120 depicted in FIG. 2 and FIG. 10. Now refer to the cross sectional views (FIG. 11 to FIG. 12) of the photonic crystal waveguide 100 depicted in FIG. 10 according to these alternate embodiments of some features, which is associated with the dashed line AA' in FIG. 10. In FIG. 11, the column members 102 and the slot 108 are filled with dielectric materials. On top of the photonic crystal slab 101, another layer of dielectric materials 106, or "superstrate" is disposed. In another preferred embodiment depicted in FIG. 12, both the substrate 105 and superstrate 106 are formed by air, leaving the photonic crystal slab 101 a suspending structure. This embodiment can be achieved by etching away the silicon dioxide layer by hydrofluoric acid.

Although the word of "light" or "lightwave" is used to denote the signals in the preceding discussions, one skilled in the art will understand that it refers to a general form of electromagnetic radiation that includes, but not limited to, visible light, infrared light, ultra-violet light, radios waves, and microwaves.

In summary, the present invention provides ultra compact device architectures for modulation, switching, and dynamic control of light transmission with reduced power consumption and high speed. Owing to the small dimensions of the devices presented herein, one can monolithically integrate the photonic crystal modulators on silicon VLSI chips to facilitate on-chip and intra-chip optical interconnects. Such device integration will significantly enhance the speed of the electronic chips with little sacrifice in volume, weight, and cost of the system. Of course, such a miniaturized, high performance electro-optic modulators are desirable in a wide range other applications including telecommunications, board level optical interconnects, local area network and optical sensing.

While the invention has been describe in connection with a number of preferred embodiments, it is not intended to limit the scope of the invention to the particular form set forth, but on the contrary, it is intended to cover such alternatives, modifications, and equivalents as may be included within the design concept of the invention as defined by the appended claims.

What is claimed is:

1. An apparatus for dynamic control of light transmission comprising: a photonic crystal waveguide comprising:
   a substrate;
   a slab disposed on the substrate;
   a core in the slab having an input side on a first end of the waveguide and an output side on a second end of the waveguide;
   two electrically conductive pads disposed onto the slab and adjacent to a portion of the core;
   a first region of the core between the electrically conductive pads;
   a second region of the core between the input side of the waveguide and the first region of the core, wherein the second region comprises a gradually increasing group index; and
   a third region of the core between the first region of the core and the output side of the waveguide, wherein the third region comprises a gradually decreasing group index.

2. The apparatus of claim 1, wherein the first, second and third regions further comprise: a slab of a first material, a plurality of substantially identical members formed from a second material and positioned within or proximate to the slab, wherein the first, second, and third regions are proximate to the plurality of substantially identical members.

3. The apparatus of claim 1, wherein the first, second and third regions support one or more guided modes.

4. The apparatus of claim 3, wherein the frequency of the guided mode in the first region can be changed by applying an electric voltage or current across the electrically conductive pads.

5. The apparatus of claim 2, wherein the second region and the third region are formed by tuning at least one of the diameter of the identical members, the spacing of the identical members, the width of the slab, and the thickness of the slab.

6. The apparatus of claim 2, wherein the slab material comprises at least one of silicon, germanium, carbon, gallium nitride, gallium arsenide, gallium phosphide, indium nitride, indium phosphide, aluminum arsenide, zinc oxide, silicon oxide, silicon nitride, alloys thereof, and organic polymers.

7. The apparatus of claim 2, wherein the plurality of substantially identical members comprise at least one substantially periodic array of substantially columnar members formed from at least one of air, silicon oxide, silicon nitride, alumina, zinc oxide, alloys thereof, and organic polymers.

8. The apparatus of claim 2, wherein the apparatus is a modulator.

9. The apparatus of claim 2, wherein the apparatus is a switch.

10. The apparatus of claim 2, wherein the apparatus is a tunable optical filter.

11. The apparatus of claim 2, wherein the substrate comprises a first material having a refractive index lower than the refractive index of the slab; and a superstrate comprising a second material having a refractive index lower than the refractive index of the slab.

12. An apparatus for dynamic control of light transmission comprising: a photonic crystal waveguide comprising:
   a substrate;
   a slab disposed on the substrate;
   a core in the slab having an input side on a first end of the waveguide and an output side on a second end of the waveguide;
   two electrically conductive pads disposed onto the slab and adjacent to a portion of the core;
   a first region of the core between the electrically conductive pads;
   a second region of the core between the input side of the waveguide and the first region of the core, wherein the second region comprises a gradually increasing group index;
   a third region of the core between the first region of the core and the output side of the waveguide, wherein the third region comprises a gradually decreasing group index;
   a first evanescent field optical mode converter coupled to the second region of the core; and
   a second evanescent field optical mode converter coupled to the third region of the core.

13. The apparatus of claim 12, wherein the first, second and third regions further comprise: a slab of a first material, a plurality of substantially identical members formed from a second material and positioned within or proximate to the slab, wherein the first, second, and third regions are proximate to the plurality of substantially identical members, and a slot inside the core extending from the first end of the waveguide to the second end of the waveguide.

14. The apparatus of claim 13, wherein the slot is filled with at least one of silicon oxide, silicon nitride, hafnium silicate, zirconium silicate, aluminum oxide, gadolinium oxide, ytterbium oxide, zirconium oxide, titanium oxide, tantalum oxide, niobium oxide, barium strontium titanate, intrinsic silicon, alloys thereof, and organic polymers.

15. The apparatus of claim 12, wherein the first optical mode converter comprises: an input waveguide with gradually decreasing width, two side waveguides with gradually increasing width on each side of the input waveguide positioned in close proximity to the input waveguide to permit evanescent field coupling between the input waveguide and the two side waveguides.

16. The apparatus of claim 12, wherein the second optical mode converter comprises:
   two side waveguides with gradually decreasing width positioned in close proximity to an output waveguide with gradually increasing width to permit evanescent coupling between the two side waveguides and the output waveguide.

17. A method for applying dynamic control to a signal comprising:
   transmitting the signal into a first transition region, wherein the first transition region comprises a first photonic crystal waveguide with a gradually increasing group index;
   transmitting the signal from the first transition region into a core region that can be dynamically tuned by external voltage or current; and
   transmitting the signal from the core region into a second transition region, wherein the second transition region comprises a second photonic crystal waveguide with a gradually decreasing group index.

18. The method of claim 17 wherein the first transition region further comprises an evanescent field optical mode converter and wherein the core region comprises a slot.

19. The method of claim 17 wherein the second transition region further comprises an evanescent field optical mode converter and wherein the core region comprises a slot.

20. The method of claim 17 wherein the first photonic crystal waveguide with the gradually increasing group index comprises a group index taper from 3 to 50 and wherein the second photonic crystal waveguide with the gradually decreasing group index comprises a group index taper from 50 to 3.

* * * * *